(12) United States Patent
Deivasigamani et al.

(10) Patent No.: US 11,187,435 B2
(45) Date of Patent: Nov. 30, 2021

(54) HEATED CONDENSATE DRAINAGE TUBE

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

(*) Notice: Subject to any disclaimer, the term of this patent is extended or adjusted under 35 U.S.C. 154(b) by 379 days.

(21) Appl. No.: 16/458,629

(22) Filed: Jul. 1, 2019

(65) Prior Publication Data

US 2021/0003318 A1 Jan. 7, 2021

(51) Int. Cl.
*F24H 8/00* (2006.01)
*F24F 13/22* (2006.01)

(52) U.S. Cl.
CPC ........... *F24H 8/006* (2013.01); *F24F 13/222* (2013.01); *F24F 2013/227* (2013.01)

(58) Field of Classification Search
CPC ...................................................... F24H 8/006
See application file for complete search history.

(56) References Cited

U.S. PATENT DOCUMENTS

| | | | | |
|---|---|---|---|---|
| 4,927,993 A * | 5/1990 | Simmons | ............ | E05B 17/0016 |
| | | | | 219/201 |
| 8,047,694 B2 * | 11/2011 | Lee | ......................... | F21V 29/71 |
| | | | | 362/547 |
| 9,303,805 B2 * | 4/2016 | Schwarzkopf | .......... | F16L 25/01 |
| 2008/0247177 A1 * | 10/2008 | Tanaka | .................... | F21S 8/026 |
| | | | | 362/373 |
| 2009/0032450 A1 * | 2/2009 | Connelly | ........... | B01D 21/0003 |
| | | | | 210/109 |
| 2011/0192180 A1 * | 8/2011 | Henderson | .......... | F24D 19/0095 |
| | | | | 62/156 |
| 2013/0263765 A1 * | 10/2013 | Merrick | .................. | F24H 8/006 |
| | | | | 110/203 |
| 2016/0327331 A1 * | 11/2016 | Forrest | .................... | F25B 39/00 |

* cited by examiner

*Primary Examiner* — Nathaniel Herzfeld (74) *Attorney, Agent, or Firm* — Tracy Jong Law Firm; Tracy P. Jong; Cheng Ning Jong (57) ABSTRACT

A passive heater for heating a drainage tube, the passive heater including: an elongated flexible thermal conductor including a first end and a second end, wherein the first end is configured to be disposed in contacting relationship with a heat source and at least a portion of the elongated flexible thermal conductor is configured to be disposed in contacting relationship with a portion of the drainage tube; and an eyelet disposed on the first end, the eyelet configured to facilitate the securement of the elongated flexible thermal conductor to the heat source, wherein the first end is configured to receive heat and transmit it along the elongated flexible thermal conductor to increase temperature of the portion of the drainage tube to prevent freezing of a fluid through the drainage tube.

12 Claims, 8 Drawing Sheets

HEATED CONDENSATE DRAINAGE TUBE

BACKGROUND OF THE INVENTION

1. The Field of the Invention

The present invention relates to a heated drainage tube. More specifically, the present invention is directed to heated condensate drainage tube.

2. Background Art

During operation, a hydrocarbon fuel-consuming high efficiency heating system produces condensates that must be drained through drainage tubes. In some occasions, its condensate drainage tube may be exposed to temperatures at or below the freezing point causing the contents of the drainage tube, i.e., condensates, to freeze, creating a blockage to the condensate drainage tube. There exists a need for a freeze-proof condensate drainage tube.

SUMMARY OF THE INVENTION

In accordance with the present invention, there is provided a passive heater for heating a drainage tube, the passive heater including:
(a) an elongated flexible thermal conductor including a first end and a second end, wherein the first end is configured to be disposed in contacting relationship with a heat source and at least a portion of the elongated flexible thermal conductor is configured to be disposed in contacting relationship with a portion of the drainage tube; and
(b) an eyelet disposed on the first end, the eyelet configured to facilitate the securement of the elongated flexible thermal conductor to the heat source,
wherein the first end is configured to receive heat and transmit it along the elongated flexible thermal conductor to increase temperature of the portion of the drainage tube to prevent freezing of a fluid through the drainage tube.

In one embodiment, the first end of the elongated flexible thermal conductor includes a plurality of branches configured for receiving heat from the heat source that is a plurality of heat sources. In one embodiment, at least one of said plurality of branches is at least partially insulated.

In accordance with the present invention, there is further provided a passive heater for heating a drainage tube, the passive heater including:
(a) an elongated flexible thermal conductor including a first end and a second end, wherein the first end is configured to be disposed in contacting relationship with a collective heat source and at least a portion of the elongated flexible thermal conductor is configured to be disposed in contacting relationship with a portion of the drainage tube; and
(b) a collar disposed on the first end of the elongated flexible thermal conductor, the collar is thermally connected to the elongated flexible thermal conductor, the collar includes at least one receptacle configured to receive the collective heat source,
wherein heat from the collective heat source is transmittable to the portion of the drainage tube to increase temperature of the portion of the drainage tube.

In one embodiment, the passive heater further includes a branch having a first end and a second end, wherein the first end of the branch is configured to receive a contributory heat source, heat received from the contributory heat source is transmittable to the second end of the branch, the second end of the branch is configured to be thermally connected to the at least one receptacle such that heat received from the contributory heat source is transmittable as at least a portion of the collective heat source. In one embodiment, the branch is at least partially insulated. In one embodiment, the contacting relationship includes contact of the elongated flexible thermal conductor with an outer wall surface of the portion of the drainage tube. In one embodiment, the contacting relationship includes contact of the elongated flexible thermal conductor with an inner wall surface of the portion of the drainage tube. In one embodiment, the contacting relationship includes contact of the elongated flexible thermal conductor within a wall of the portion of the drainage tube.

In accordance with the present invention, there is further provided a passive heater for heating a drainage tube, the passive heater including a fluid jacket including an inlet port and an outlet port, wherein the inlet port is configured to receive a fluid and at least a portion of the fluid jacket is configured to be disposed in a contacting relationship with the drainage tube such that the drainage tube can be heated by the fluid to prevent freezing of a drainage through the drainage tube and said outlet port is configured to return the fluid.

In one embodiment, the fluid is a liquid. In another embodiment, the fluid is a gas.

An object of the present invention is to provide a means for preventing and/or inhibiting freezing of condensates from the combustion of a hydrocarbon fuel.

Another object of the present invention is to provide a passive means for preventing and/or inhibiting freezing of condensates from the combustion of a hydrocarbon fuel.

Another object of the present invention is to provide a means for preventing and/or inhibiting freezing of condensates from the combustion of a hydrocarbon fuel where the means is available on demand.

Another object of the present invention is to provide a means for preventing and/or inhibiting freezing of condensates from the combustion of a hydrocarbon fuel where the means is not significantly impacting the resources allocated for domestic water and space heating purposes.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—drainage tube
4—thermal conductor
6—tube wall
8—eyelet or washer or ring
10—heating system
12—thermal source
14—thermal sink
16—frozen condensate
18—exhaust of drainage tube
20—drain grate
22—drain
24—door
26—louver
28—cold air flow
30—branch thermal conductor
32—section with higher density thermal conductor
34—section with lower density thermal conductor
36—fastener
38—receptacle
40—fastener
42—eyelet
44—insulator
46—connector
48—cross-sectional area of branch thermal conductor
50—cross-sectional area of thermal conductor
52—inlet
53—outlet
54—stub
56—heated fluid conductor
58—jacket
60—fitting
62—tubing
64—collar
66—partition
68—direction Particular Advantages of the Invention The present heated condensate drainage tube or thermal conductor configured for heating a condensate drainage tube enables condensates to remain in the liquid form such that they can continue to be drained even when the local ambient temperature of the condensate drainage tube has dropped to or below the freezing point.

The present heated condensate drainage tube or thermal conductor configured for heating a condensate drainage tube is configured to tap into one or more existing heat sources already made available for fluid heating. No dedicated or new heat sources are required to prevent condensates from freezing, thereby simplifying the manner in which condensates are kept in the liquid form such that they can continue to be drained even when the local ambient temperature of the drainage tube has dropped to or below the freezing point.

In one embodiment, the present thermal conductor is built into or built integrally with a condensate drainage tube, thereby simplifying the manner which the condensate drainage tube is heated. In one embodiment, heat is fed into the condensate drainage tube at its first end via a collar configured for receiving one or more branches. This allows branches of appropriate length to be selected for use, eliminating the use of branches that are unnecessarily long and keeping the thermal conductor and condensate drainage tube neat and easily serviceable and heat transfer through to the condensate drainage tube efficient.

The present heated condensate drainage tube or thermal conductor configured for heating a condensate drainage tube is operational only on demand. In other words, the present heated condensate drainage tube or thermal conductor configured for heating a condensate drainage tube is operational only when it is necessary to do so. The concerns of condensate freeze only exist when condensates are generated, i.e., only when the combustion of a hydrocarbon fuel has occurred. Therefore, without a demand, no condensates would have been generated that would need to be drained.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
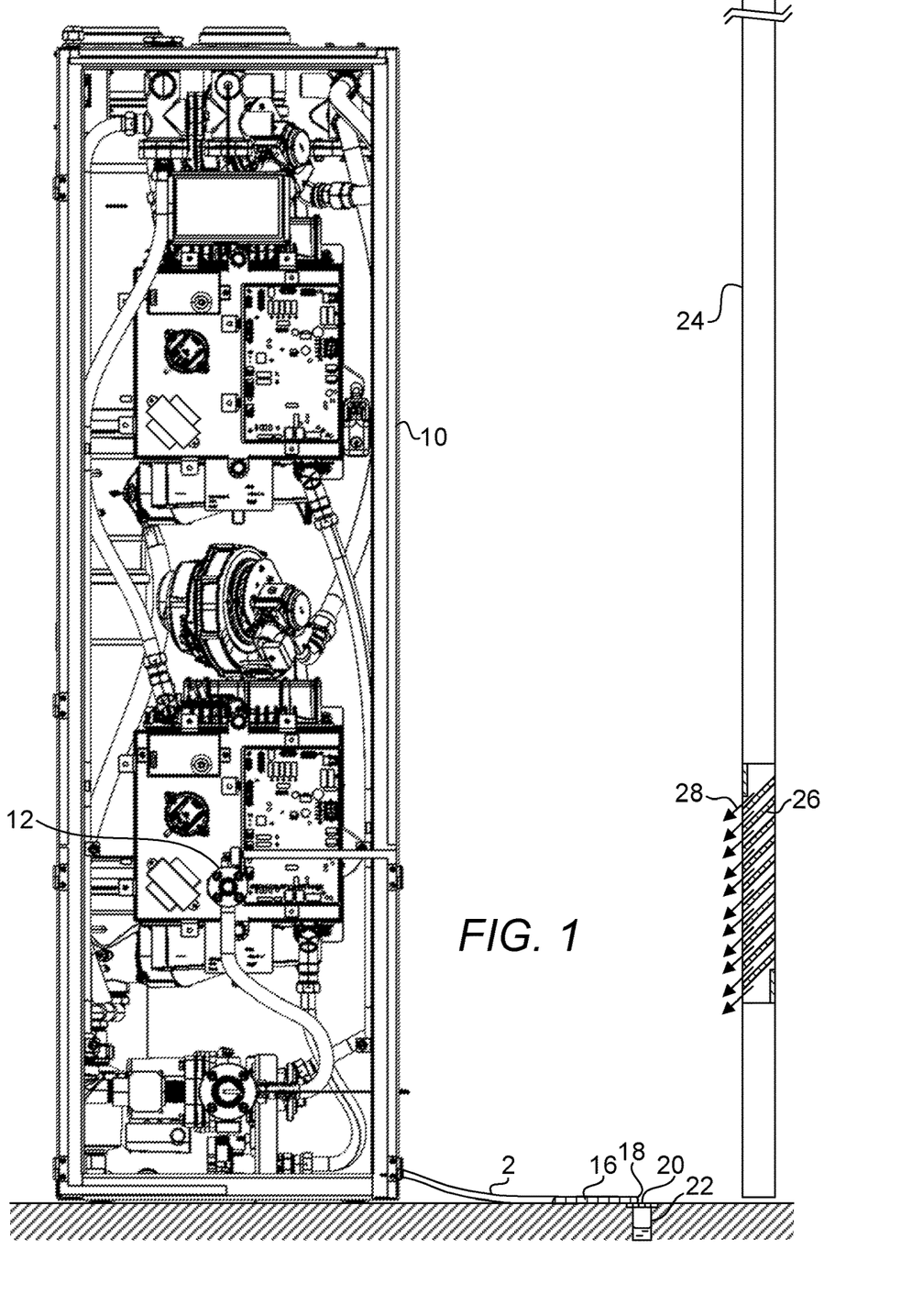
FIG. 1 is a diagram depicting a condensate drainage tube adapted to drain condensates generated from a water heater.

FIG. 1 is a diagram depicting a condensate drainage tube 2 adapted to drain condensates generated from a water heater 10. The water heater relies on the combustion of a hydrocarbon fuel to generate heat. Condensate generation is one of the hallmarks of a high efficiency (e.g., greater than 90% efficiency) condensing combustion system. A high efficiency condensing combustion system achieves high efficiency by condensing water vapor in the flue gases and recovering its latent heat of vaporization. The result is condensed vapor that is typically collected and put through a neutralizer and drained. Condensate is an acidic solution containing various concentrations of nitric, nitrous, sulfuric, sulfurous acids and hydrochloric acids and can be harmful for drainage pipes, septic tanks, treatment plants and other waste handling systems. In conventional neutralizer systems, calcium carbonate may be used as a neutralizing agent to raise the pH of collected condensate before it is drained as an effluent. No neutralizer systems are shown but rather a condensate drainage tube 2 is shown to be directed to a drain 22. A first end of the condensate drainage tube 2 is connected to either a pre-neutralized drain portion, e.g., the drainage line or part 56 of U.S. patent application Ser. No. 15/859,169 (if no condensate neutralization is desired) or a post-neutralized drain portion, e.g., the outlet of the condensate neutralizer or part 54 of the '169 application (if condensate neutralization is desired). A second end of the condensate drainage tube 2 or the exhaust 18 of the drainage tube is preferably and typically secured to a drain grate 20 to ensure that the condensate or neutralized condensate is directed by gravity down and into the drain 22. Under certain ambient conditions, the second end of the drainage tube tends to be clogged due to the cold air flow 28 which enters the mechanical room in which the water heater and the drainage tube 2 are disposed and sinks to the lowest point of the mechanical room, i.e., the mechanical room floor which at least a portion of the condensate drainage tube 2 runs. The movement of cold air is enhanced when a door 24 to the mechanical room is equipped with louvers 26. As the condensate arrives by gravity at or near the exhaust 18, it would have lost sufficient heat to the surroundings of the drainage tube 2. Left unattended for a prolonged period at sufficiently low temperature at or near the exhaust 18, frozen condensate 16 can form at or near the exhaust 18, backing up further condensate flow to the inlet of the drainage tube 2 and affecting the efficient operation or the operation of a condensate neutralizer or water heater to which the drainage tube 2 is connected. A number of corrective measures may be taken to address the issue where condensates freeze that prevent efficient flow of the condensates. The mechanical room may be made more airtight to prevent cold flow to enter it. The ambient temperature of the mechanical room may be increased to ensure that no parts of the mechanical room will experience temperature that is sufficiently low where freezing of the condensates can occur. However, such measures will require sufficient energy to be expended for the sole purpose of preventing the freezing of condensates. The ensuing disclosure reveals an apparatus useful for preventing freezing of condensates without requiring an additional heating source to the apparatuses that create the condensates in the first place. Further, in one embodiment, the heat energy used for preventing freezing of condensates is sourced from one or more components of the water heater which would otherwise be wasted. For instance, the bottom casting of a coil tube water heater configured to channel flue gas out to the exhaust has already be disposed at a temperature higher than the exhaust of the drainage tube during the operation of the water heater. In another embodiment, heat energy, may in addition, be sourced from an outlet of the water heater. Therefore, the present heated condensate drainage tube or thermal conductor configured for heating a condensate drainage tube can be said to be a "passive" device or apparatus.

Figure 2:
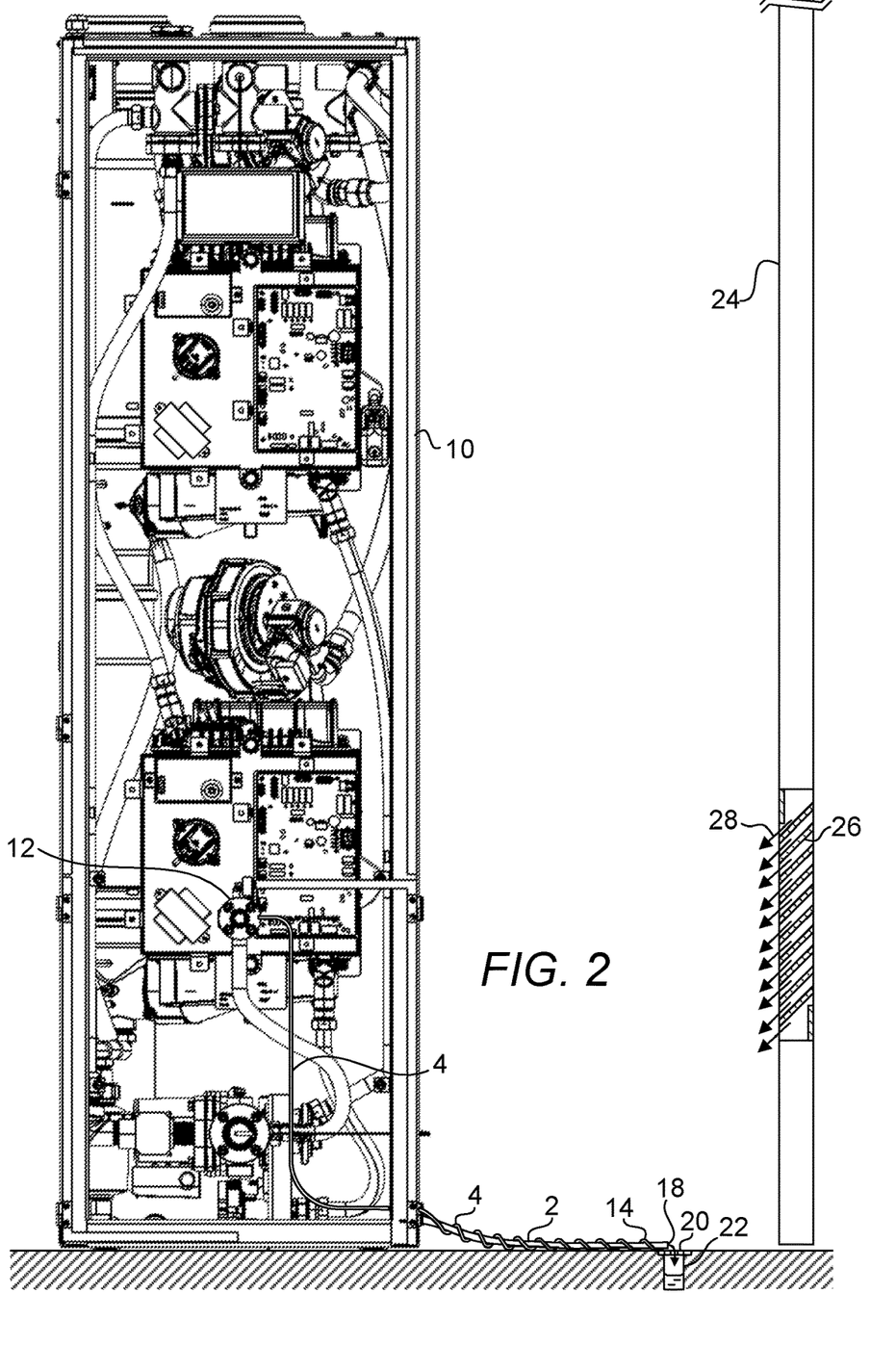
FIG. 2 is a diagram depicting an augmented condensate drainage tube adapted to drain condensates generated from a water heater.

FIG. 2 is a diagram depicting an augmented condensate drainage tube 2 adapted to drain condensates generated from a water heater. It shall be noted that, in this embodiment, a thermal conductor 4 is now wrapped around a conventional drainage tube 2 to transmit heat from a thermal source 12 to a thermal sink 14 which is disposed at or near the exhaust of 18 of the drainage tube 2. The thermal source 12 is preferably a part that is heated with heat energy that would be wasted if not tapped into, e.g., from the flue gas of a coil tube heat exchanger directly or the flue gas exhaust of a coil tube heat exchanger, an example of which can be found in part 36 of U.S. patent application Ser. No. 16/213,930. In another example, the thermal source 12 may also be the heated fluid or a product of the water heater. Although less desirable as the removal of heat energy from the heated fluid for the purpose of preventing freezing of the condensates will reduce the water temperature at a point of use, the effects of such a removal of heat energy is negligible in terms of the lower temperature at the point of use or the additional energy required to replenish the energy drawn for this purpose.

Figure 3:
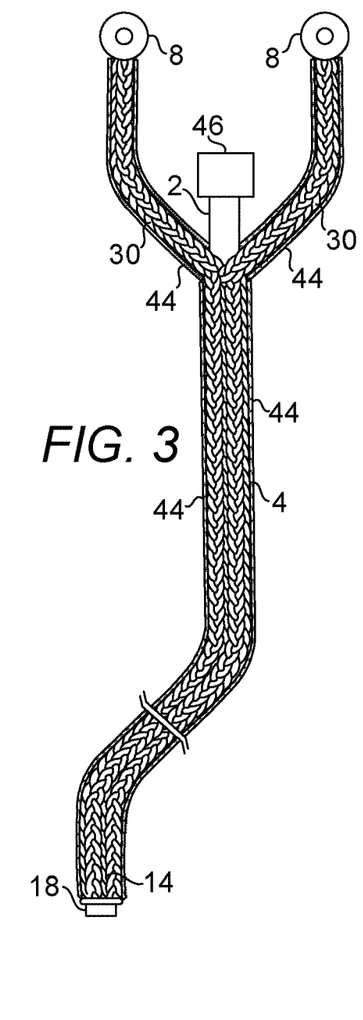
FIG. 3 is a diagram depicting a purpose-built thermal conductor useful for augmenting the temperature of a condensate drainage tube adapted to drain condensates generated from a water heater.

FIG. 3 is a diagram depicting a purpose-built thermal conductor useful for augmenting the temperature of a condensate drainage tube 2 adapted to drain condensates generated from a water heater. Here, it can be shown that, in order to receive heat energy from multiple thermal sources, the first end of the thermal conductor may be branched into two branches 30 or more. In order to facilitate the securement of the thermal conductor 4 to one or more heat sources, an eyelet 8 is disposed on the first end, e.g., by crimping the eyelet 8 onto a branch 30. A screw can be used to secure and tighten the eyelet 18 to a thermal source as long as the surface area of the eyelet 18 that comes in contact with the thermal source is sufficiently large, heat conduction from the thermal source to the thermal sink 14 occurs without impediment. The branches 30 and any one of the thermal conductors disclosed herein may be constructed from strands of thermal conductors, e.g., copper, etc., that continue on to form a larger-diameter thermal conductor 4. Parts of the thermal conductors 4, 30 not required to transmit heat by conduction to the drainage tube 2, may be insulated to prevent heat loss along their length from the first end to the second end. It shall be noted that the branches 30 are insulated with insulators 44. Branches need not be of the same length. For instance, the branches can be configured for different lengths depending on the reaches required of each branch. All branches are preferably used and should not be left unconnected to a heat source as an unconnected branch can become an unused heat sink and the intended heat sink, i.e., the second end of the thermal conductor 4 will receive reduced transmission of heat. In case a surplus branch exists, this branch shall be also be thermally tied to a heat source, e.g., the same heat source another branch 30 is thermally connected to. A drainage tube 2 is encased in the thermal conductor 4 that is braided such that the drainage tube 2 and its contents can be heated by the heat transmitted from the branch thermal conductors 30 to the exhaust 18 of the drainage tube 2. It shall be noted that the thermal conductor 4 is also insulated with insulators 44 to reduce heat loss from the thermal conductor 4 to its surroundings.

Figure 4:
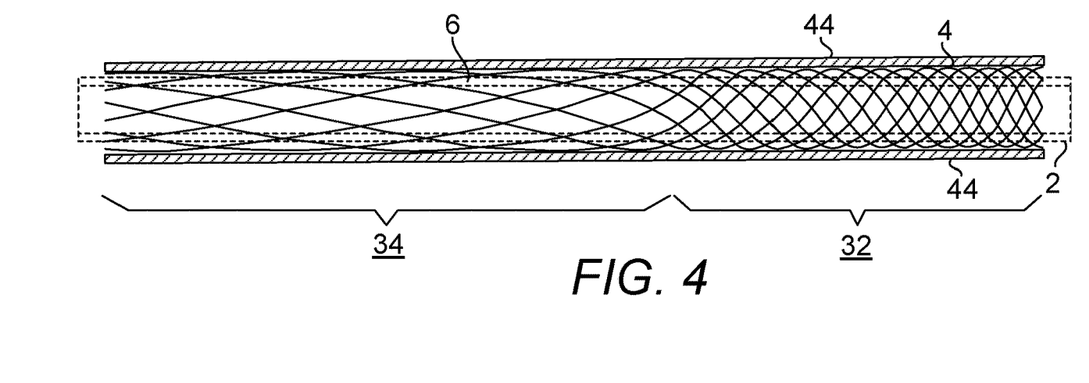
FIGS. 4-6 are diagrams depicting various possible configurations of a thermal conductor useful for augmenting the temperature of a condensate drainage tube adapted to drain condensates generated from a water heater.
Figure 5:
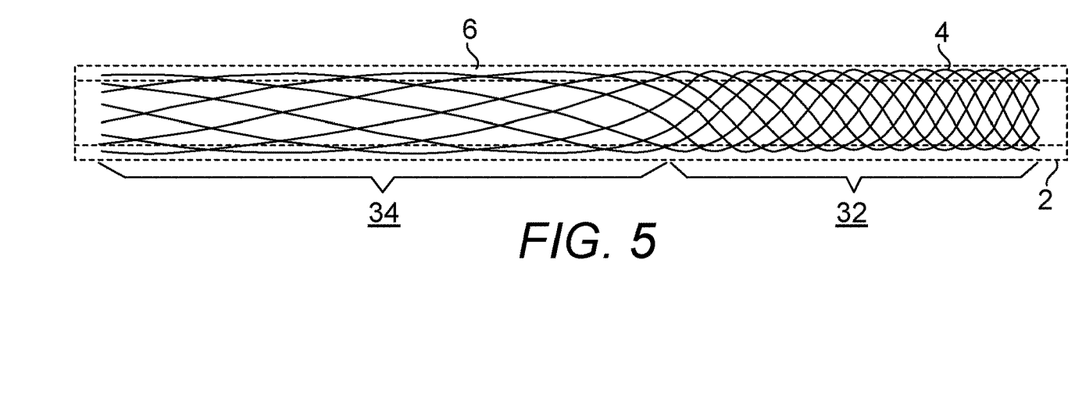
Figure 6:
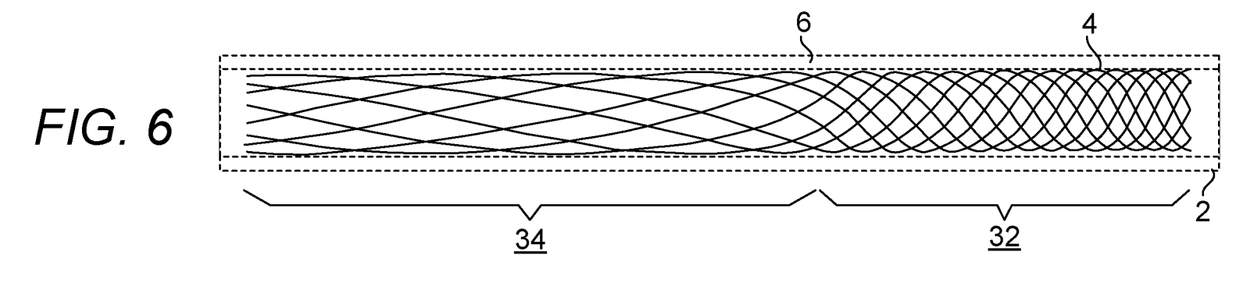

FIGS. 4-6 are diagrams depicting various possible configurations of a thermal conductor 4 useful for augmenting the temperature of a condensate drainage tube 2 adapted to drain condensates generated from a water heater. Here, the thermal conductor 4 is configured in the form of a "cage" although it may also be braided as shown in FIG. 3. Note that the density of the cage material can be varied along the length of the thermal conductor 4. This is useful if more heating is desired at a certain location of the thermal conductor 4, e.g., at the exhaust 18 of a drainage tube 2. It shall be noted that section 32 of the thermal conductor is disposed at a higher density than section 34. Further, the manner in which the cage is disposed with respect to the wall 6 of the drainage tube 2 can also affect the effectiveness of the thermal conductor 4 for preventing freezing of the condensates. FIG. 4 shows a cage 4 that is disposed on the exterior surface of the drainage tube 2 with the cage 4 coming in contact with the exterior surface of the drainage tube 2. An insulation 44 may be provided to minimize heat loss from the cage to the surroundings of the cage. FIG. 5 shows a cage 4 that is disposed within the wall 6 of the drainage tube during fabrication to form an integral tube wall and cage. The wall 6 can be made from a uniform material, e.g., polyurethane or another polymer or a nonreacting metal resistant to neutralized or pre-neutralized condensates. The wall 6 can also be made from multi-materials, e.g., metal for the layer enclosed by the cage 4 for excellent heat conduction and polymer for the layer enclosing the cage 4 for excellent insulation to prevent heat loss to the ambient environment of the drainage tube 2. FIG. 6 shows a cage 4 that is disposed within the lumen of the wall 6. Here, some parts of the cage 4 come in direct contact with the condensates.

Figure 7:
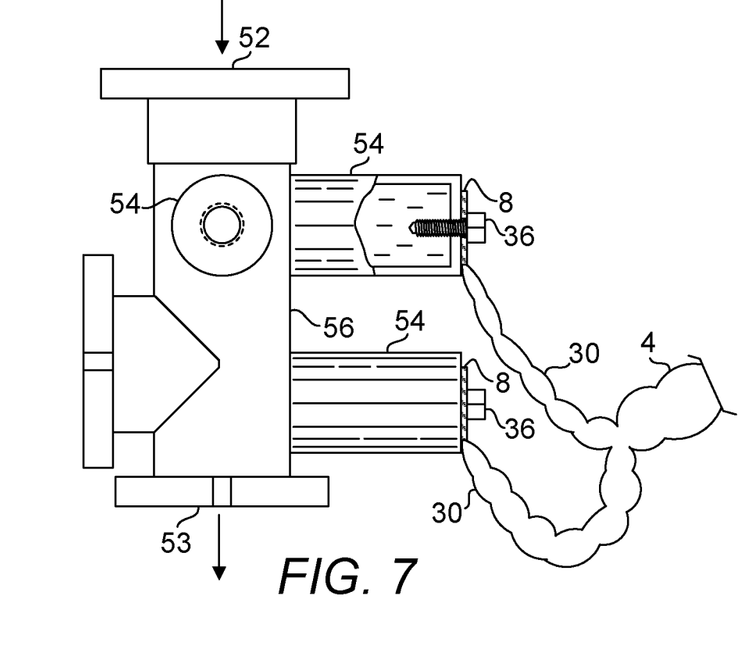
FIG. 7 is a diagram depicting one scenario where branched thermal conductors may be used to receive heat from heat sources.
Figure 8:
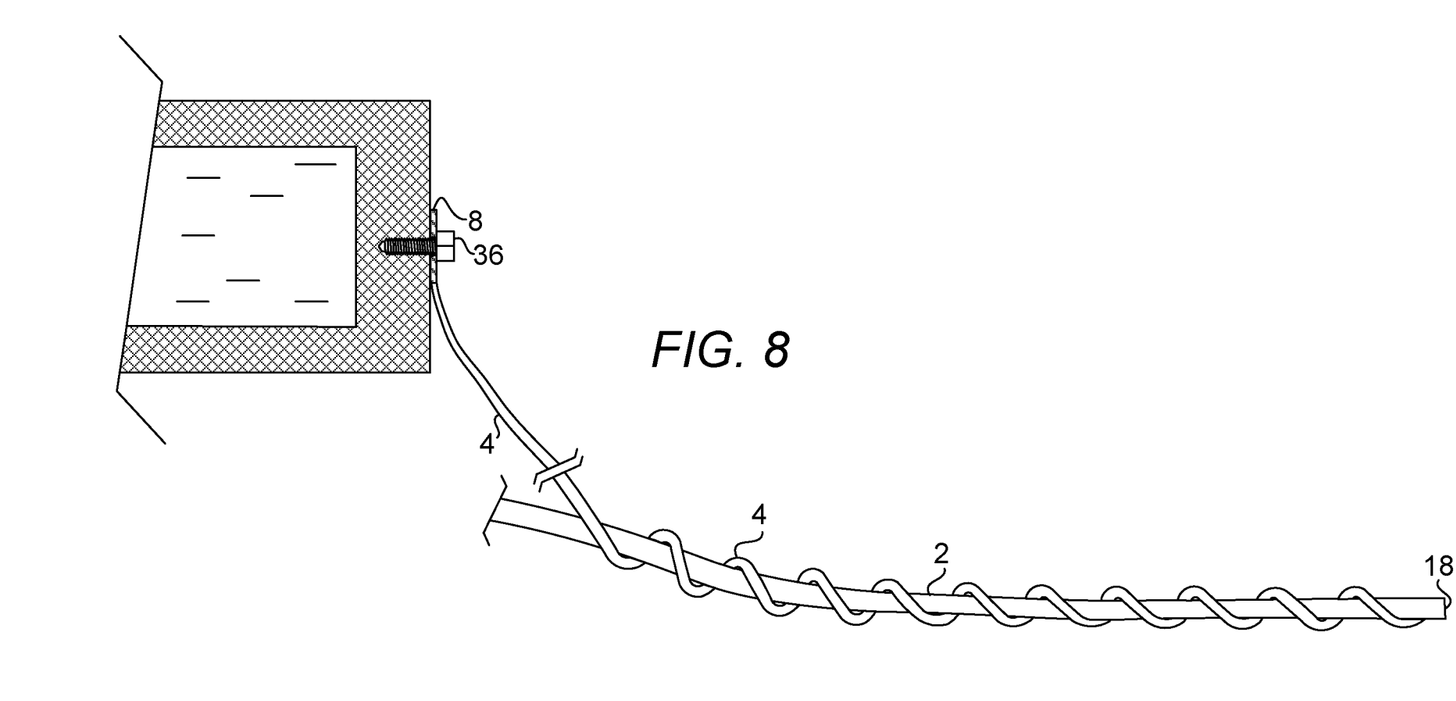
FIG. 8 is a close-up view of one scenario where a thermal conductor may be used to heat a condensate drainage tube.

FIG. 7 is a diagram depicting one scenario where branched thermal conductors 30 may be used to receive heat from heat sources. Here, there are two branches 30, each connected to a stub 54. Although each branch 30 is shown thermally connected to a stub 54, the wall to which a branch 30 is connected can be any wall that is heated in the process of heating a fluid or medium in the heating system. A fastener 36 is shown being used to secure a branch 30 to a stub 54 by means of an eyelet 10. It shall be noted that the eyelets 10 come in direct contact with the wall that is heated and the fastener 36 with the medium. The medium enters through inlet 52 and exits through outlet 53 and the cavity of the stubs 54 is exposed to this medium, e.g., at about 140 degrees F. FIG. 8 is a close-up view of one scenario where a thermal conductor 4 may be used to heat a condensate drainage tube. Here, both the fastener 36 and the eyelet 8 come in direct contact with a solid part but the fastener 36 is not exposed to the medium. In the embodiment shown, the thermal conductor 4 is wrapped around a conventional drainage tube to provide some heating to the conventional drainage tube.

Figure 9:
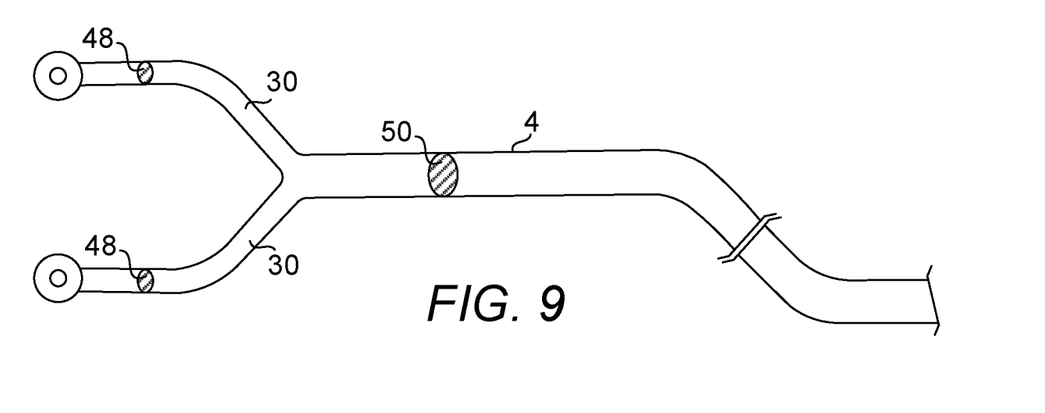
FIG. 9 is a diagram depicting size relationships between branch and main thermal conductors.

FIG. 9 is a diagram depicting size relationships between branch and main thermal conductors 30, 4. Here, the effective cross-sectional area of each branch 30 is represented using part 48 and the effective cross-sectional area of the thermal conductor 4 is represented using part 50. The ratio of the total effective branch area 48 to the effective cross-sectional area 4 of the thermal conductor 4 shall be close to about 1.0.

Figure 10:
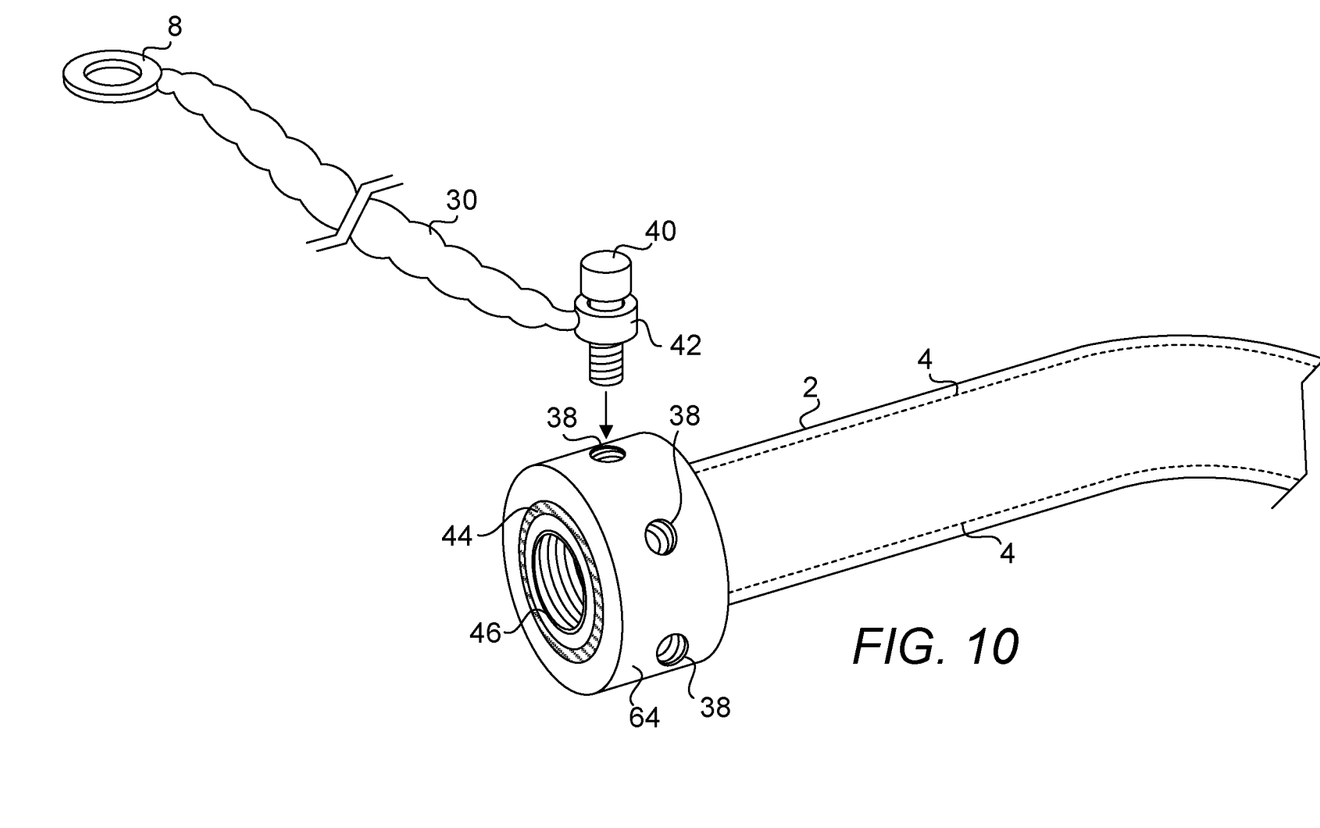
FIG. 10 is a diagram depicting one embodiment of a condensate drainage tube configured for receiving heat through removable branches.

FIG. 10 is a diagram depicting one embodiment of a condensate drainage tube 2 configured for receiving heat through removable branches 30. A collar 64 is disposed on the first end of the drainage tube 2. A connector 46, e.g., a male connector, is provided to allow connection of the drainage tube 2 to a water heater. A plurality of receptacles 38 are provided such that one or more branches 30 may be connected to the collar 64. Branches 30 may be configured at suitable lengths so that they may reach appropriate heat sources. Each branch 30 is a thermal conductor having two ends one of which ends is terminated with an eyelet 8 and the other one of which is terminated with eyelet 42. To secure a branch 30 to the collar 64, a fastener 40 is used to thread eyelet 42 and screwed into a matching receptacle 38. During operation of a water heater, if the eyelet 8 is determined to be disposed at a temperature significantly higher than the temperature of the connector 46, e.g., by about 10 degrees F., no isolator that thermally isolates the collar 64 and the connector 46 will be needed. However, if the eyelet 8 is determined to be disposed at a temperature largely the same as the temperature of the connector 46, e.g., less than 10 degrees F., an isolator 44 that thermally separates the collar 64 and the connector 46 will be necessary. This way, heat received via the eyelet 8 can readily be conducted through the collar 64 to the second or distal end of the drainage tube 2.

Figure 11:
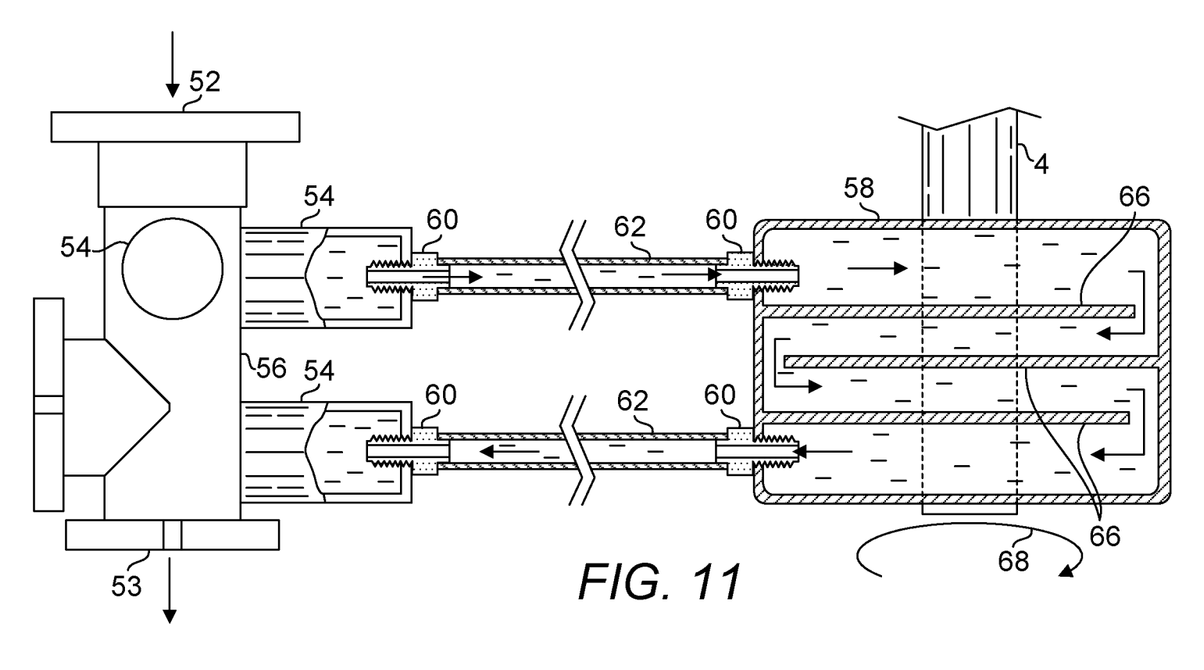
FIG. 11 is a diagram depicting another means for heating a condensate drainage tube.

FIG. 11 is a diagram depicting another means for heating a condensate drainage tube 2. Here, heat is transferred via a flow established through the stubs 54 with the flow exiting a stub 54 of a fluid conductor 56 through a jacket 58 via flexible tubings 62 connected to the stubs 54 and the jacket 58. The jacket 58 is preferably wrapped around the second end of the drainage tube 2 in the direction indicated, i.e., direction 68, to elevate the temperature of the second end of the drainage tube 2 and the condensate flowing through the drainage tube 2 above the freezing temperature. It shall be noted that, again, this means of heating the condensate requires no additional heating elements other than the devices already used for water heating. The flow can be a heated liquid, e.g., water, flow from a heating system. In another embodiment, the flow can be a flue flow, a result of a hydrocarbon fuel combustion. Partitions 66 disposed within the jacket 58 are provided to force the flow within the jacket 58 through the entire jacket 58 to ensure that condensates are heated properly in the portion of the drainage tube 2 that is encased in the jacket 58. The jacket 58 and any one of the thermal conductors 4 disclosed herein may additionally and/or alternatively be used to heat any parts of the heating system/s which supply heat to the thermal conductors 4.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A passive heater for heating a drainage tube having a length and an outer surface, said passive heater comprising:
 (a) an elongated flexible thermal conductor comprising a first end and a second end, wherein said first end is configured to be disposed in contacting relationship with a heat source and at least a portion of said elongated flexible thermal conductor is configured to be disposed in contacting relationship with a portion of the drainage tube and said elongated flexible thermal conductor configured to be disposed along the entire length of the drainage tube and surround the outer surface of the drainage tube; and (b) an eyelet disposed on said first end, said eyelet configured to facilitate the securement of the elongated flexible thermal conductor to the heat source, wherein said first end is configured to receive heat and transmit it along said elongated flexible thermal conductor to increase temperature of the portion of the drainage tube to prevent freezing of a fluid through the drainage tube.

2. The passive heater of claim 1, wherein said first end of said elongated flexible thermal conductor comprises a plurality of branches configured for receiving heat from said heat source that is a plurality of heat sources.

3. The passive heater of claim 2, at least one of said plurality of branches is at least partially insulated.

4. The passive heater of claim 1, wherein said contacting relationship comprises contact of said elongated flexible thermal conductor with an outer wall surface of the portion of the drainage tube.

5. The passive heater of claim 1, wherein said contacting relationship comprises contact of said elongated flexible thermal conductor with an inner wall surface of the portion of the drainage tube.

6. The passive heater of claim 1, wherein said contacting relationship comprises contact of said elongated flexible thermal conductor within a wall of the portion of the drainage tube.

7. A passive heater for heating a drainage tube having a length and an outer surface, said passive heater comprising:

(a) an elongated flexible thermal conductor comprising a first end and a second end, wherein said first end is configured to be disposed in contacting relationship with a collective heat source and at least a portion of said elongated flexible thermal conductor is configured to be disposed in contacting relationship with a portion of the drainage tube and said elongated flexible thermal conductor configured to be disposed along the entire length of the drainage tube and surround the outer surface of the drainage tube; and (b) a collar disposed on said first end of said elongated flexible thermal conductor, said collar is thermally connected to said elongated flexible thermal conductor, said collar comprises at least one receptacle configured to receive said collective heat source, wherein heat from said collective heat source is transmittable to said portion of the drainage tube to increase temperature of the portion of the drainage tube.

8. The passive heater of claim 7, further comprising a branch having a first end and a second end, wherein said first end of said branch is configured to receive a contributory heat source, heat received from the contributory heat source is transmittable to said second end of said branch, said second end of said branch is configured to be thermally connected to said at least one receptacle such that heat received from the contributory heat source is transmittable as at least a portion of the collective heat source.

9. The passive heater of claim 8, said branch is at least partially insulated.

10. The passive heater of claim 7, wherein said contacting relationship comprises contact of said elongated flexible thermal conductor with an outer wall surface of the portion of the drainage tube.

11. The passive heater of claim 7, wherein said contacting relationship comprises contact of said elongated flexible thermal conductor with an inner wall surface of the portion of the drainage tube.

12. The passive heater of claim 7, wherein said contacting relationship comprises contact of said elongated flexible thermal conductor within a wall of the portion of the drainage tube.

* * * * *